United States Patent
Bußer et al.

(10) Patent No.: US 10,642,628 B2
(45) Date of Patent: May 5, 2020

(54) METHOD AND DEVICE FOR GENERATING A DEVICE-SPECIFIC IDENTIFIER, AND DEVICES COMPRISING A PERSONALIZED PROGRAMMABLE CIRCUIT COMPONENT

(71) Applicant: Siemens Aktiengesellschaft, München (DE)

(72) Inventors: Jens-Uwe Bußer, Neubiberg (DE); Dominik Merli, Mertingen (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 131 days.

(21) Appl. No.: 15/743,737

(22) PCT Filed: Jun. 27, 2016

(86) PCT No.: PCT/EP2016/064823
§ 371 (c)(1),
(2) Date: Jan. 11, 2018

(87) PCT Pub. No.: WO2017/009026
PCT Pub. Date: Jan. 19, 2017

(65) Prior Publication Data
US 2018/0203709 A1 Jul. 19, 2018

(30) Foreign Application Priority Data
Jul. 15, 2015 (DE) .................. 10 2015 213 300

(51) Int. Cl.
*G06F 9/44* (2018.01)
*G06F 9/445* (2018.01)
(Continued)

(52) U.S. Cl.
CPC .......... *G06F 9/44505* (2013.01); *G06F 7/588* (2013.01); *G06F 9/48* (2013.01);
(Continued)

(58) Field of Classification Search
CPC ........ G06F 9/44505; G06F 7/588; G06F 9/48; G06F 21/602; G09C 1/00;
(Continued)

(56) References Cited

U.S. PATENT DOCUMENTS

| | | | | |
|---|---|---|---|---|
| 5,920,627 A | * | 7/1999 | Mionet | H04L 9/083 380/256 |
| 7,278,128 B1 | | 10/2007 | Trimberger | |

(Continued)

FOREIGN PATENT DOCUMENTS

| | | |
|---|---|---|
| DE | 102008023912 A1 | 11/2009 |
| WO | WO-2009138287 A1 * | 11/2009 ............. H04L 9/004 |

OTHER PUBLICATIONS

Koch D. et al: Hierarchical Reconfiguration of FPGAs, https://www.lis.ei.tum.de/fileadmin/w00bdv/www/fpl2014/W2a_01_FPL2014_Hierarchical_Reconfiguration_of_FPGAs_Koch_Beckhoff.pdf.
(Continued)

*Primary Examiner* — Zahid Choudhury
(74) *Attorney, Agent, or Firm* — Schmeiser, Olsen & Watts LLP

(57) ABSTRACT

Provided is a method for generating a device-specific identifier in a device which contains at least one programmable circuit component and the circuit of which consists of individual components that are configured by loading a bitstream, having the following method steps: displaying the reference identifier as a bit sequence and assigning each bit of the reference identifier to a respective different component of the circuit component; generating a reference bitstream for a reference circuit of the circuit component, the bitstream containing at least the specified component of the reference identifier; and entering the device specific identifier as a binary sequence by overwriting the bits of the
(Continued)

corresponding components of the reference identifier directly in the reference bitstream.

16 Claims, 4 Drawing Sheets

(51) Int. Cl.
| | |
|---|---|
| *H03K 19/17768* | (2020.01) |
| *G09C 1/00* | (2006.01) |
| *H04L 9/08* | (2006.01) |
| *H04L 9/06* | (2006.01) |
| *G06F 7/58* | (2006.01) |
| *G06F 9/48* | (2006.01) |
| *G06F 21/60* | (2013.01) |

(52) U.S. Cl.
CPC ............ *G06F 21/602* (2013.01); *G09C 1/00* (2013.01); *H03K 19/17768* (2013.01); *H04L 9/0662* (2013.01); *H04L 9/0866* (2013.01); *H04L 2209/12* (2013.01); *H04L 2209/34* (2013.01)

(58) Field of Classification Search
CPC ............ H03K 19/17768; H04L 9/0662; H04L 9/0866; H04L 2209/12; H04L 2209/34
See application file for complete search history.

(56) References Cited

U.S. PATENT DOCUMENTS

| | | | |
|---|---|---|---|
| 7,581,117 | B1 | 8/2009 | Green |
| 7,636,439 | B2* | 12/2009 | Nakabayashi ........ H04L 9/0662 380/44 |
| 2012/0045061 | A1 | 2/2012 | Danger |
| 2012/0057704 | A1 | 3/2012 | Chen |
| 2014/0043059 | A1 | 2/2014 | Newell |

OTHER PUBLICATIONS

PCT International Search Report and Written Opinion of International Searching Authority dated Sep. 26, 216 corresponding to PCT International Application No. PCT/EP2016/064823 filed Jun. 27, 2016.

* cited by examiner

METHOD AND DEVICE FOR GENERATING A DEVICE-SPECIFIC IDENTIFIER, AND DEVICES COMPRISING A PERSONALIZED PROGRAMMABLE CIRCUIT COMPONENT

CROSS-REFERENCE TO RELATED APPLICATIONS

This application claims priority to PCT Application No. PCT/EP2016/064823, having a filing date of Jun. 27, 2016, based on German Application No. 10 2015 213 300.1, having a filing date of Jul. 15, 2015, the entire contents both of which are hereby incorporated by reference.

FIELD OF TECHNOLOGY

The following relates to a method and an apparatus for generating a device-specific identifier through bitstream-personalization of a programmable circuit element, a device comprising a programmable circuit element, and a computer program product (non-transitory computer readable storage medium having instructions, which when executed by a processor, perform actions) that carries out the steps of the method, as well as a data carrier that stores the computer program product.

BACKGROUND

Programmable circuit elements, also known as field programmable gate arrays (FPGA) are integrated circuits of digital technology, into which logical circuits can be programmed. FPGAs therefore differ from computer processors (CPU) and programmable logic controllers (PLC) in which the functional structure must be specified before fabrication, and only the temporal flow has to be programmed, in that in the case of an FPGA, even the functional structure is still to be programmed after production, or can even be changed again. This is even possible on-site at the time of installation and during use.

During the programming of an FPGA, functional structures, and thereby different integrated components, i.e. the desired circuit of the FPGA, are specified. This circuit can be created graphically in the form of a circuit diagram or by means of a hardware description language, also known as HDL. A bitstream of the integrated components, e.g. of lookup tables or flip-flops and associated connecting structures is then generated with a synthesis tool, taking particular account of the hardware resources of the target FPGA. At run time, i.e. when the operating voltage at the FPGA is switched on, this bitstream is then loaded from an additionally necessary, non-volatile memory into the volatile FPGA. With this, the components are implemented in the FPGA as specified in the circuit diagram. The FPGA retains this circuit structure until the operating voltage is switched off, or until a different bitstream is loaded.

In the circuit diagram, also referred to below simply as the circuit, data such as constants can also be hard-coded. These can be used internally by the FPGA, or may also be output. Cryptographic keys can also be placed in the FPGA in this way. Hard-coded data within a circuit can very easily be changed, for example using the HDL hardware description language. A new bitstream, however, must be created with the synthesis tool from every circuit, and this typically takes many minutes.

The bitstream contains the configuration data, i.e. the circuit, in a proprietary, unknown format, which is often manufacturer-specific or also FPGA-specific. If it is desired to operate devices using FPGAs with individual data bitstreams which contain, for example, individual device serial numbers and/or individual cryptographic device keys, a unique bitstream must be generated afresh for each device with the aid of the synthesis tool. Even with a small number of devices, this entails a high requirement for computation and time to generate the different bitstream files, and can, in particular, hardly be carried out when the devices are produced at a high frequency.

FPGAs are known from the Internet publication by Dirk Koch and Christian Beckhoff: Hierarchical Reconfiguration of FPGAs, FPL 2004, https://www.fpl2014.tum.de/fileadmin/w00bpo/www/gallery/W2a 01 FPL2014 Hierarchical Reconfiguration of FPGAs Koch-Beckhoff.pdf, which support decomposition of the FPGA programming into individual modules which are generated separately and stored as partial bitstreams, and which can be loaded independently of one another and exchanged at run time. Cryptographic keys can also be made available as modules. However, this dynamic loading of modules has so far only been supported by a small number of newer FPGAs. In addition, the part that is to be exchanged must already be identified when the circuit diagram is designed, placed into its own module, and provided with an interface. In addition, a cryptographic key introduced in this way is present in a separate file on the device, and can therefore be easily identified and read out.

SUMMARY

An aspect relates to being able to insert device-specific data into an FPGA with little computing effort, and thus to be able to quickly and easily personalize large numbers of devices.

The method according to embodiments of the invention for the generation of a device-specific identifier in a device (200) which contains at least one programmable circuit element (210) and whose circuit consists of individual components that are configured by loading a bitstream, comprises the steps of:

- representation (11) of the reference identifier (R-Id) as a bit sequence and the assignment of each bit of the reference identifier (R-Id) to a different component of the circuit element in each case,
- generation (12) of a reference bitstream (B0) for a reference circuit (F0) of the circuit element (210), in which at least the predetermined components of the reference identifier (R-Id) are contained,
- entering (13) the device-specific identifier (G-Id) as a binary sequence by overwriting the bits of the corresponding components of the reference identifier (R-Id) directly into the reference bitstream (B0).

Personalized information can thus be placed in a bitstream for a programmable circuit element, without the bitstream having to be regenerated each time from the circuit by a synthesis tool. Through the assignment, and thus with the binding, of each bit of the reference identifier to a specific component of the programmable circuit element, e.g. a flip-flop, a lookup table or a Block RAM, a clear and in particular linear relationship between the bits of the reference identifier in the circuit and the bits of the bitstream generated from this by a synthesis tool is achieved. Each bit of the reference identifier is thus represented by a specific number of bits in the bitstream which are specific for this bit of the data bitstream. If the corresponding positions in the bitstream of all the bits of the reference identifier that are to be encoded for a particular device-specific identifier are known, a device-specific identifier can be introduced directly by modifying the bits in the bitstream. A translation of a circuit with device-specific identifier to a bitstream is no longer necessary. The time for the generation of a personalized bitstream is thus greatly shortened.

In an advantageous embodiment, each component of the reference identifier is configured to add either a value of zero or a value of one.

In this way any arbitrary identifier can be represented by a number of components that output the corresponding bit sequence.

In an advantageous embodiment, the bits through which a component of the reference identifier is encoded in the bitstream, are determined through the method steps of:
(a) generating a reference bitstream of the reference circuit,
(b) generating a further bitstream for a further circuit changed by at least one bit of the predetermined reference identifier, and
(c) determining at least one position of a bit that is changed in the generated further bitstream with respect to the reference bitstream.

If the bitstream contains the circuit in an unknown proprietary format, a kind of translation rule for each component of the reference identifier in the corresponding bits in the bitstream can be generated by the method steps. If the translation rule is known, for example, for each single component of the reference identifier, then any arbitrary device-specific identifier with a length of the reference identifier can be entered directly into the bitstream.

In an advantageous embodiment, the predetermined reference identifier consists of a plurality of partial reference identifiers distributed arbitrarily in the reference circuit.

This allows a device-specific identifier to be placed in a veiled or obfuscated manner in the bitstream. This makes it more difficult for an attacker to localize the device-specific identifier in the bitstream and to determine the identifier.

In an advantageous exemplary embodiment, the further bitstream is only generated for a partial region of the reference circuit which comprises the reference identifier.

In this way it is not necessary in each case to analyze, for example, the entire reference bitstream. The computing time for determination of the bits in the bitstream that correspond to a component of the reference identifier can in this way he reduced further.

In an advantageous embodiment, the circuit, changed by at least one bit, is used as a new reference circuit for the determination of the position of the next bit of the reference identifier.

This permits an efficient determination of the bitstream bit belonging to one bit of the reference circuit. A renewed loading of the reference circuit to determine the bitstream bit of a further component of the reference identifier is thus avoided. The circuit used in the previous determination step can be used as a new reference circuit. The difference between the bitstreams of sequential reference circuits is now determined.

In an advantageous embodiment, more than one bit of the reference identifier is changed in a multiply changed circuit.

Frequently occurring bit combinations in the device-specific identifier can thus be determined and used through the correspondingly changed bitstream as a whole.

In an advantageous embodiment, the position of the bits in the bitstream for a plurality of the changed bits in the changed circuit are determined through combining a plurality of further bitstreams generated from multiply changed circuits.

Care should be taken here to ensure that the combinations of multiply changed circuits extend over the full range of the data bits of the desired reference identifier, so that arbitrary device-specific identifiers can be encoded in the bitstream.

In an advantageous embodiment, a table is generated in which each changed bit of the reference circuit is assigned to at least one position of a bit that is changed in the further bitstream generated therefrom in comparison with the reference bitstream.

The table thus contains the information as to which bits in the bitstream have to be changed in comparison with the reference bitstream in order to change bits of the reference identifier with respect to the reference circuit. With this table each device can be given a unique, individual bitstream, and thus provided with a unique device-specific identifier in a simple manner, without in each case having to generate the individual bitstream by means of a synthesis tool starting from an individual circuit.

In an advantageous embodiment, the device-specific identifier is a cryptographic key or a serial number.

When a bitstream is generated by a synthesis tool, a checksum is usually prepared over the bitstream, and added to the bitstream. In this way the resulting bitstream is protected against unintended changes such as, for example, transmission errors. In an advantageous embodiment, this checksum over the device-specific bitstream is appropriately adjusted after changing the device-specific bitstream with respect to the reference bitstream.

An apparatus according to embodiments of the invention for the generation of a device-specific identifier in a programmable circuit element, whose circuit consists of individual components and which is configured by loading a bitstream, comprises an assignment unit that is designed to represent a reference identifier as a bit sequence, and to assign a different component of the circuit element respectively to each bit of the reference identifier, a generation unit that is designed to generate a reference bitstream for a reference circuit of the circuit element, in which at least the predetermined components of the reference identifier are contained, and an insertion unit that is designed to insert the device-specific identifier as a binary sequence by overwriting the bits of the corresponding components of the reference identifier directly in the reference bitstream.

The apparatus can thus carry out a bitstream personalization of a programmable circuit element without having to recreate the corresponding bitstream from an individual circuit using a synthesis tool.

In an advantageous embodiment, the apparatus additionally comprises a determination unit that is designed to generate a reference bitstream of the reference circuit, a further bitstream for a further circuit changed by at least one bit of the predetermined reference identifier, and to determine at least one position of a bit that is changed in the further generated bitstream with respect to the reference bitstream.

The apparatus can thus determine this encoding even for non-disclosed encoding of the components of a circuit.

In an advantageous embodiment, the apparatus additionally comprises a memory unit that is designed to save a table in which the at least one position of a bit that is changed in the further bitstream generated therefrom in comparison with the reference bitstream is assigned to each changed bit of the reference circuit.

Any arbitrary device-specific identifier can thus be encoded directly in the bitstream without having to create a corresponding bitstream from a circuit that contains the device-specific identifier using a synthesis tool. This leads to a significant reduction in the time required to generate the bitstream.

A first device according to embodiments of the invention comprises a programmable circuit element, wherein a device-specific identifier is inserted into the programmable circuit element in accordance with the method according to embodiments of the invention.

Such first devices are easy and economical to manufacture with device-specific identifiers in FPGAs.

A second device according to embodiments of the invention comprises a programmable circuit element, a memory device that contains a device-specific identifier, a reference bitstream of a reference circuit of the circuit element, and a table, wherein the at least one position of a bit that is changed in the further bitstream generated therefrom in comparison with the reference bitstream is assigned to each changed bit of the reference circuit in the table. It comprises moreover a random number generator that generates a device-specific identifier, and an encoding unit that generates a device-specific bitstream making use of the table from the reference bitstream and the device-specific identifier.

A second device can, for example, itself generate serial numbers in the FPGA and provide them to other functions as an input value.

A third device according to embodiments of the invention comprises a programmable circuit element, a memory device that contains a reference bitstream of a reference circuit of the circuit element, and a table, wherein the at least one position of a bit that is changed in the further bitstream generated therefrom in comparison with the reference bitstream is assigned to each changed bit of the reference circuit in the table, a random number generator that generates a device-specific identifier, and an encoding unit that generates a device-specific bitstream making use of the table from the reference bitstream and the device-specific identifier.

In such a device a secret key, for example, that represents a device-specific identifier is never known outside the device, and is thus particularly secure against manipulation and unauthorized access.

In an advantageous embodiment, the memory device is designed to delete the table after generating the device-specific bitstream.

In this way, reading out the table during later operation is also prevented. The device-specific identifier generated could, in turn, be deduced from the table.

A computer program product according to embodiments of the invention that can be loaded directly into a memory of a digital computer comprises program code segments that are suitable for carrying out the steps of the method according to one of claims 1 to 10. A data carrier according to embodiments of the invention stores the computer program product according to embodiments of the invention.

BRIEF DESCRIPTION

Some of the embodiments will be described in detail, with references to the following figures, wherein like designations denote like members, wherein.

Parts that correspond to one another are given the same reference signs in all the figures.

DETAILED DESCRIPTION

Figure 2:
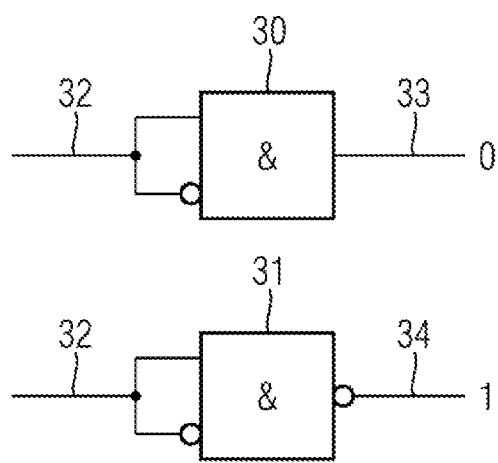
FIG. 2 shows schematically an exemplary embodiment of a component of a programmable circuit element which can output a value of 0 or 1.

In order to be able to insert a device-specific identifier into a device comprising programmable circuit elements, this can be done through bitstream-personalization of a programmable circuit element. For this purpose, a device-specific circuit which comprises the device-specific identifier as well as further components of the programmable circuit element is generated and, for example by means of a synthesis tool, a device-specific bitstream is generated from that and is loaded into the programmable circuit element. Since the generation of the device-specific bitstream BK by a synthesis tool is very time-consuming, the method according to embodiments of the invention is now explained with reference to a flow diagram, see FIG. 2.

Starting from an initial state 10, a reference identifier is represented as a bit sequence in a first method step 11, and a different component of the circuit element is assigned to each bit of the reference identifier. The circuit is structured here such that each bit of the reference identifier, also referred to below as a data bit, is permanently bound to a specific component of the programmable circuit element.

Figure 1:
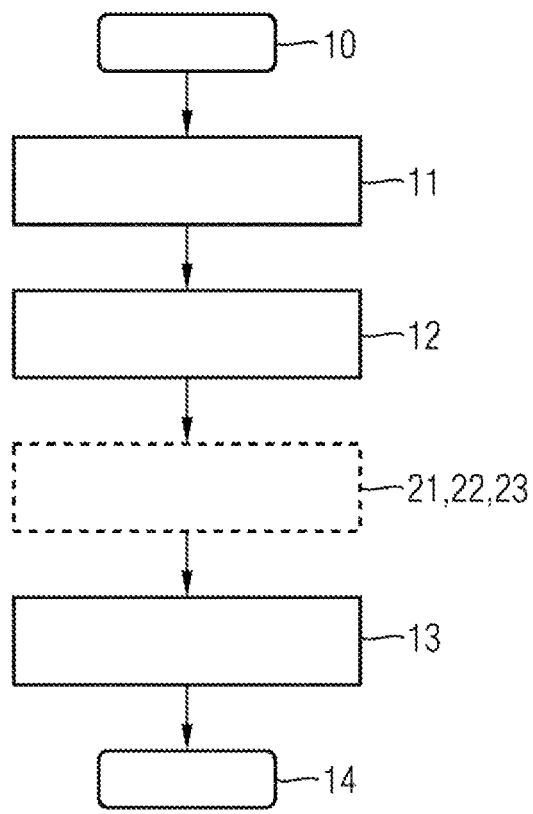
FIG. 1 shows a flow diagram of an exemplary embodiment of a method.

Each data bit is represented here by a component of the circuit. The component is configured here such that it either outputs the value zero or the value one. Such a component 30, 31, see FIG. 1, can, for example, be configured as a lookup table. The component 30 is configured such that, independently of an applied input signal 32, no signal 33 is output at the output, and the value zero is thus represented. The component 31, in contrast, is configured such that independently of the applied input signal 32 a signal is always output at the output 34, which is interpreted as the value one. Any constant data value can thus be encoded by a number of such components such as, for example, 30, 31 of a circuit element, and output.

In method step 12 a reference bitstream is generated for a reference circuit of the circuit element in which at least the predetermined components of the reference identifier are contained. The reference circuit can, in addition to the components of the reference identifier, also comprise further components if the circuit element is to carry out further functions. In particular here, the same predetermined components are always to be used to represent the bits of the reference identifier.

In method step 13, the device-specific identifier is entered as a binary sequence by overwriting the bits of the corresponding components of the reference identifier directly in the reference bitstream. By loading the bitstream into the circuit element, the device-specific identifier is active in the circuit element, and can be read from there into the device that contains the circuit element.

This is, in particular, easily possible if the encoding of the corresponding components in the bitstream is known. If the encoding of the individual components in the bitstream is not known, then through the additional method steps 21, 22, 23, which are shown dotted in FIG. 2, as an optional method step.

For this purpose a reference bitstream B0 of the reference circuit F0 is generated in method step 21. A further bitstream is then generated for a changed further circuit differing by at least one bit from the predetermined reference identifier, see method step 22. Through a comparison 23 of the further bitstream with the reference bitstream B0 at least one position of a bit that is changed in the further bitstream that has been generated in comparison with the reference bitstream B0 is determined. This is repeated until the positions and values of all the bits of the reference identifier in the bitstream are known. It is also possible for only the positions and values of a subset of the bits of the reference identifier to be determined, in particular if device-specific identifiers to be encoded require fewer bits for their representation.

The insertion of the bits of the desired device-specific identifier into the reference bitstream B0 can either be carried out immediately after the determination of the position of a single bit or a plurality of data bits in the bitstream. It is also however possible for the encoding in the bitstream to be determined only for that portion of the bits that are required for the device-specific identifier, or for all the bits of the reference identifier R-Id. A device-specific bitstream, with all the bits of the device-specific identifier is then encoded into the reference bitstream B0.

Figure 3:
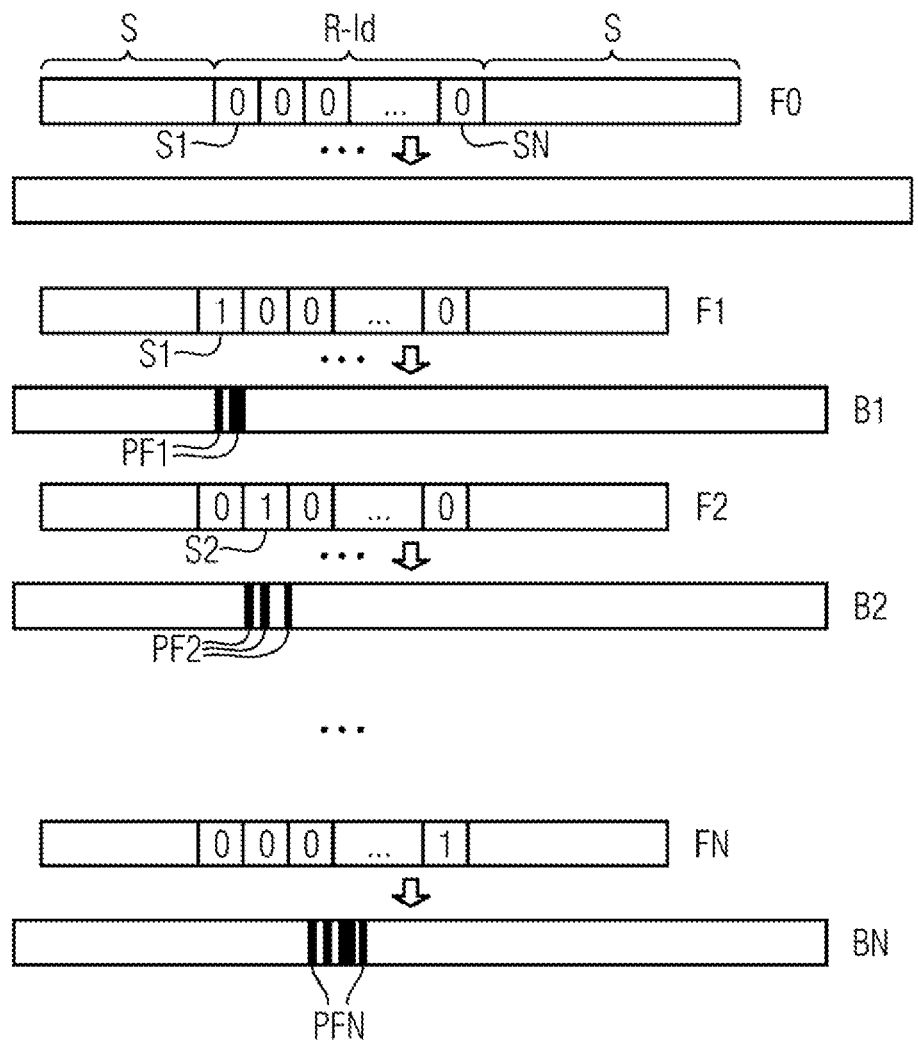
FIG. 3 shows schematically an exemplary embodiment of the determination of the position of bits in the bitstream for each one bit in a reference circuit.

FIG. 3 shows an exemplary embodiment for the execution of steps 21 to 23. The reference circuit F0 comprises a large number of components, wherein the components S1, . . . , SN each have a fixed assignment to a data bit of an N-bit-long reference identifier R-Id. The further components, which carry out other functions S of the reference circuit F0, are illustrated by way of example through two partial regions of components in FIG. 3. The functions S can also be encoded as a contiguous block or, however, in a plurality of partial regions of the reference circuit F0. The reference identifier R-Id can also be assigned in one block or, however, as a plurality of non-continuous blocks, not illustrated here, in the reference circuit F0. A reference bitstream B0 is now generated from this reference circuit F0 for example by means of a synthesis tool. The reference identifier R-Id consists entirely of zeroes in the example illustrated.

A further circuit F1 is now prepared in which one component S1, which represents a first, for example low-value, bit of the reference identifier R-Id is changed in comparison with the reference circuit F0, here encoded as a one instead of a zero. The further circuit F1 is converted by means of the synthesis tool into a corresponding further bitstream B1, see method step 12. Through comparison of the further bitstream B1 with the reference bitstream B0, the positions PF1 of the bits changed in the bitstream B1, and thereby the bits of the component S1 in the bitstream, are determined. Correspondingly, a second further circuit F2 is generated, in which the second bit, or the second component S2 of the reference identifier R-Id, is set to one, and then an associated second bitstream B2 is generated from it. Through a comparison of the second further bitstream B2 with the reference bitstream B0 the changed bits PF2 of the second bitstream, and thus the encoding of the changed second bit S2 of the reference identifier, are in turn determined. An assignment of the changed bits PF1, PF2 to the corresponding components S1, S2, or to bits of the reference identifier R-Id is, for example, saved in a table. This is repeated for every bit of the reference identifier R-Id. The data bitstream FN changed in the last bit of the reference identifier, in this case Nth bit, and the bitstream BN generated from it with the changed bits PFN, are also illustrated here.

The changed bits PF1, . . . , PFN do not necessarily appear in the bitstream B1, . . . , BN in the same sequence as the changed bits S1, . . . , SN in the reference identifier R-Id in the circuit F1 to FN. Regions with changed bits PFi in the generated further bitstream Bi for different changed bits S1, . . . , Sn in the circuit F1, . . . , FN can also overlap. In particular, a plurality of bits PFi in the bitstream can be changed for one changed bit Si in the circuit.

The predetermined reference identifier R-Id does not have to consist exclusively of zeroes, as illustrated, but can be any arbitrary binary sequence.

It is also possible for determination of the bits PFi in the bitstream for the changed second bit Si of the reference identifier R-Id to compare the bitstream Bi with the bitstream Bi-1 instead of with the reference bitstream B0. Any bitstream for which the associated reference identifier is known can serve as the reference bitstream.

It is not necessary to respectively convert the entire further circuit Fi into a further bitstream Bi. It is possible—if the circuit element or the associated synthesis tool supports this—also to work with a partial region of the further circuit Fi which must, however, contain the reference identifier. In this way the computing time for the generation of the bitstream Bi and thus for the determination of the encoding, i.e. the bits PFi of the data bits Si in the bitstream, Bi can be further reduced.

The positions determined in this way for the individual changed bits Si of the reference identifier R-Id are, for example, entered into a table. The encoding of a data bit, or of a component, can then be determined from the table and directly entered into the reference bitstream B0.

It is also possible to change a plurality of bits Si of the reference identifier R-Id and then to convert a data bitstream referred to as multiply changed by means of the synthesis tool into a further bitstream. The bits changed with respect to the reference bitstream B0 can then be determined through combinations of different multiply changed data bitstreams. It is also however possible for the changed bits in the bitstream resulting from a combination of changed bits in the circuit to be entered into the table and then used for the encoding of a device-specific identifier G-Id in the reference bitstream B0. Care should be taken here to ensure that the combination of the multiply changed data bitstreams are spread over the full range of the desired reference identifier R-Id, since otherwise not all arbitrary, device-specific identifiers can be generated in the bitstream.

Figure 4:
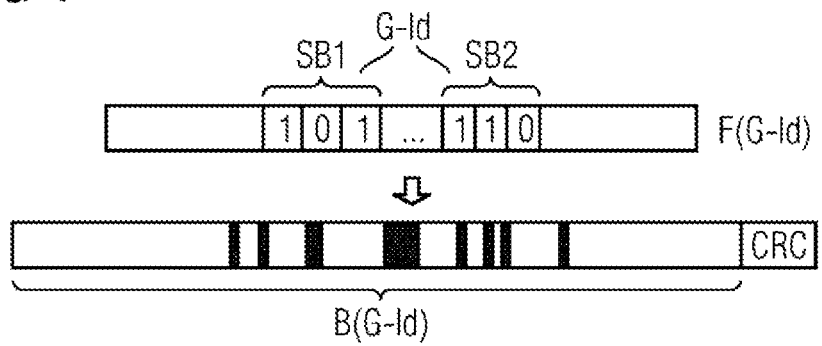
FIG. 4 shows schematically an example of a device-specific circuit and of a resulting device-specific bitstream.

A circuit F(G-Id) with a device-specific identifier G-Id is illustrated in FIG. 4. The device-specific identifier G-Id is here distributed over the circuit in components in two partial blocks SB1, SB2. In order to protect a device-specific bitstream B(G-Id) generated in this way against unintended changes, such as transmission errors for example, or to be able to detect these, a checksum CRC is formed over the bitstream B(G-Id). This checksum CRC is usually appended to the device-specific bitstream.

Figure 5:
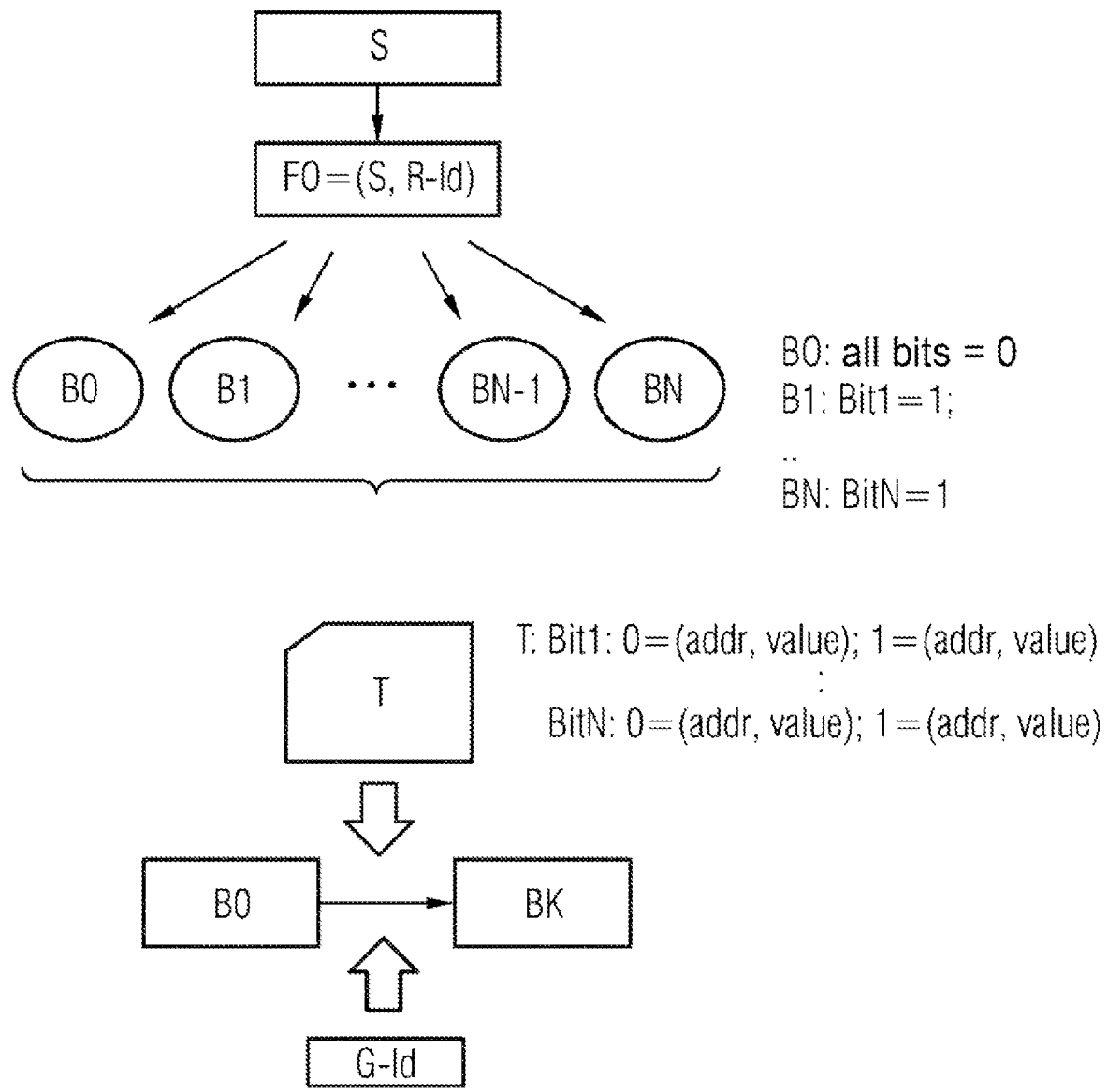
FIG. 5 shows schematically a method according to embodiments of the invention.

In FIG. 5, the generation of personalized bitstreams, i.e. a bitstream that contains a device-specific identifier such as, for example, a cryptographic key, is illustrated. Through such a personalized bitstream, devices of the same construction receive a device-specific identifier.

Starting from a circuit S, which forms the other functions of a programmable circuit element, a reference data stream F0 is generated in preparation for the personalization, in that a reference identifier R-Id, with a length of, for example, N bits, is inserted in predetermined components. From this reference circuit F0, N+1 bitstreams B0, . . . , BN are now generated. B1, . . . , BN are here generated, for example, from circuits F1 to FN, differing in each case by one bit from the reference identifier.

From a comparison of each of the bitstreams Bi with the reference bitstream B0, the encoding of the changed bit Si of the circuit Fi is determined. These determined bits in the bitstream are assigned in a table T to the correspondingly changed bit Si in the circuit Fi. The resulting table T thus for example contains an entry with the corresponding encoding in the bitstream for every bit of the reference identifier R-Id that is set to the value one. A device-specific bitstream can thus be prepared directly in the bitstream from a reference bitstream B0 and the desired device-specific identifier G-Id making use of the table T.

To generate bitstreams with sequential serial numbers, it is favorable to start with a reference circuit F0 or with the associated reference bitstream B0. The lowest-value bit S1 in the reference data bitstream is then changed, and the corresponding further bitstream B1 is generated. From this, a first serial number 0 and the serial number 1 can be generated from this as device-specific bitstream. Only after this is a further circuit F2 generated with a changed bit S2, and the corresponding bitstream B2 is determined. All the device-specific bitstreams that can be formed with the bits of the reference identifier that have so far been changed are now generated from this. These are the serial numbers 0 to 3. A changed circuit F3 with a subsequent bit S3 set to the value 1 is only generated, and the associated further bitstream B3 formed, to generate the device-specific bitstream for serial number 4. All the device-specific bitstreams that can be formed with the bits 1 to 3 of the reference identifier, i.e. serial numbers 4 to 7, can now be generated. The number of determinations of the encoding of the reference bit is minimized in this way.

Figure 6:
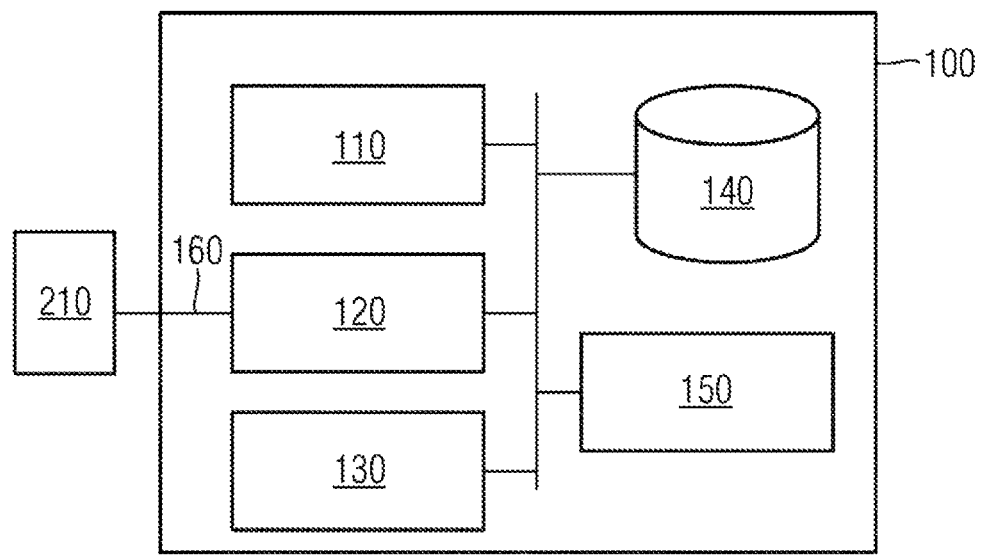
FIG. 6 shows a block diagram of an apparatus according to embodiments of the invention.

The apparatus 100 illustrated in FIG. 6 for the generation of a device-specific programming of a device with a programmable circuit element 210 comprises a generation unit 110, an insertion unit 120 and an assignment unit 150. The assignment unit 150 is designed to represent a reference identifier R-Id as a bit sequence, and to assign a different component of the circuit element to each bit of the reference identifier R-Id.

The generation unit 110 is designed to generate a reference bitstream B0 for a reference circuit F0 of the circuit element 210, in which at least the predetermined components of the reference identifier R-Id are contained. The insertion unit 120 makes it possible to insert the device-specific identifier G-Id as a binary sequence by overwriting the bits of the corresponding components of the reference identifier R-Id directly in the reference bitstream B0, and to adjust a checksum if one is present.

The apparatus 100 additionally comprises a memory unit 140 that to store a table T with an assignment of each single bit of the reference identifier in a circuit to its encoding in the bitstream. The table T can already be available in the apparatus, or can be determined by a determination unit 130.

The determination unit 130 is designed to generate a reference bitstream B0 of the reference circuit F0, a further bitstream Bi for a further circuit Fi changed by at least one bit of the predetermined reference identifier R-Id, and to determine at least one bit PFi which is changed in the generated further bitstream Bi with respect to the reference bitstream B0. The bits PFi determined are assigned in the table to the changed bit of the reference identifier R-Id, and stored.

The insertion unit 120 comprises an interface 160, through which an appropriately formed device-specific bitstream can be loaded into the programmable circuit element 210.

Figure 7:
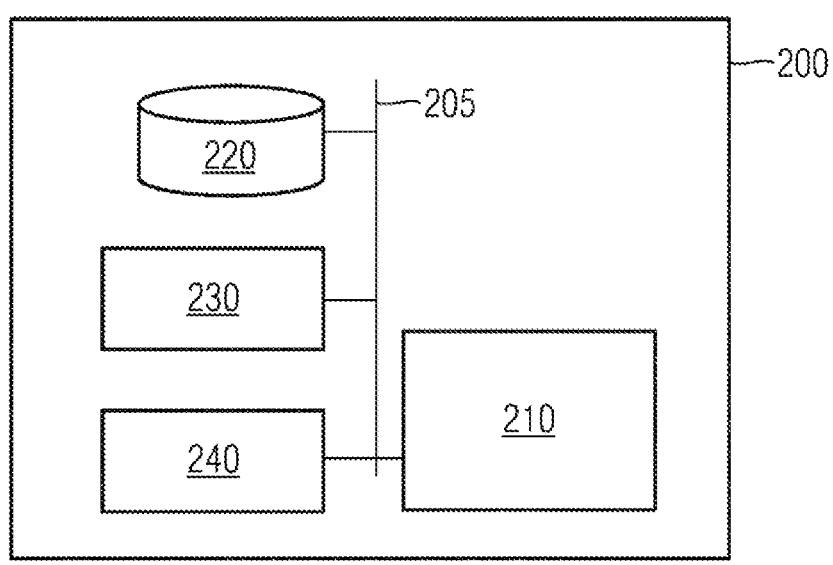
FIG. 7 shows a block diagram of an exemplary embodiment of a device according to embodiments of the invention.

FIG. 7 shows a device 200 that comprises a programmable circuit element 210. The device 200 can be formed as a first device. A first device only necessarily comprises the circuit element 210 into which a device-specific identifier is inserted according to the method described, or making use of the apparatus 100.

The device 200 can also be formed as a second device. In that case it comprises a programmable circuit element 210 and, in addition, a memory device 220 and an encoding unit 240. The memory device 220 contains a device-specific identifier G-Id, a reference bitstream B0 of a reference circuit B0 of the circuit element 210, along with a table. In the table, the at least one position PFi of a bit that is changed in comparison with the reference bitstream B0 in the further bitstream Bi generated from this is assigned to each changed bit Si of the reference circuit F0. The encoding unit 240 generates a device-specific bitstream B(G-Id) from the reference bitstream B0 and the device-specific identifier R-Id making use of the table.

The device 200 can also be formed as a third device. The third device 200 comprises, in addition to the components of the second device, a random number generator 230 which, for example, generates true random numbers for a randomly formed key. The device furthermore comprises an encoding unit 240 which generates a device-specific bitstream B(G-Id) from the reference circuit and the device-specific identifier G-Id using the table T, and transfers it into the programmable circuit element 210.

The method, the apparatus and the device can also save the device-specific identifier G-Id in a masked or obfuscated form on the device 200. The bits of the device-specific identifier G-Id are then, for example, differently distributed or contained in the circuit in a permutated sequence, or are processed at run-time by a function before they can be used as a key.

With the method described it is, in particular, possible to supply devices with a programmable circuit element in production with an individual bitstream. The method functions with all available programmable circuit elements, including those which do not support reloading modules. With this, devices can easily be supplied with device-specific keys, or with individual serial numbers. If a device does not contain a random number generator 230, then an individual entropy file can be inserted in the same way into the programmable circuit element. The entropy file can then be used as a basis for the formation of cryptographic keys. Attackers who successfully compromise a device only obtain access to the individual key of a single circuit element, and not to a system-wide key.

If an encoding has to be determined for each bit, depending on the length of the key, the method is particularly suitable for the insertion of symmetric keys or of elliptical curve keys. Longer keys such as, for example, RSA keys can also be implemented with the method of the invention, but do, however, require significantly more effort to prepare the assignment table T. If the assignment of the encoding to the reference bits is known, the method is suitable for any type of cryptographic keys and for other data such as serial numbers and so forth.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The invention claimed is:

1. A method for generating a device-specific identifier in a device, which contains at least one programmable circuit element and whose circuit comprises individual components which are configured by loading a bitstream, the method comprising:
representing a reference identifier as a bit sequence, and the assignment of each bit of the reference identifier to a different component of the at least one programmable circuit element in each case;
generating a reference bitstream for a reference circuit of the at least one programmable circuit element, in which at least the predetermined components of the reference identifier are contained; and
entering the device-specific identifier as a binary sequence by overwriting the bits of the corresponding components of the reference identifier directly in the reference bitstream;
wherein the bits through which a component of the reference identifier is encoded in the bitstream are determined by the method:
(a) generating the reference bitstream of the reference circuit,
(b) generating a further bitstream for a further circuit changed by at least one bit of the predetermined reference identifier, and
(c) determining at least one position of a bit which is changed in the generated further bitstream in comparison with the reference bitstream.

2. The method as claimed in claim 1, wherein each component of the reference identifier is configured in a fixed manner to output either a value zero or a value one.

3. The method as claimed in claim 1, wherein an existing checksum across the reference bitstream is replaced by a newly calculated checksum over the device-specific bitstream.

4. The method as claimed in claim 1, wherein the predetermined reference identifier consists of a plurality of partial reference identifiers distributed arbitrarily in the reference circuit.

5. The method as claimed in claim 1, wherein the further bitstream is only-generated for a partial region of the reference circuit which comprises the reference identifier.

6. The method as claimed in claim 1, wherein the circuit, which is changed by one bit, is used as a new reference circuit for the determination of the position of a next bit of the reference identifier.

7. The method as claimed in claim 1, wherein, in a multiply changed circuit, more than one bit of the reference identifier is changed, and/or through the combination of a plurality of further bitstreams generated from multiply changed circuits, the positions of the bits in the bitstream of the changed bit in the changed circuit are determined.

8. The method as claimed in claim 1, wherein a table is generated in which the at least one position of a bit that is changed in comparison with the reference bitstream in the further bitstream generated therefrom is assigned to each changed bit of the reference circuit.

9. The method as claimed in claim 1, wherein the device-specific identifier is a cryptographic key or a serial number.

10. An apparatus for the generation of a device-specific identifier in a programmable circuit element whose circuit comprises individual components, which is configured by loading a bitstream, comprising:
an assignment unit which is configured to represent a reference identifier as a bit sequence and to assign a different component of the at least one programmable circuit element to each bit of the reference identifier; a generation unit which is designed to generate a reference bitstream for a reference circuit of the at least one programmable circuit element in which at least the predetermined components of the reference identifier are contained;
an insertion unit which is designed to insert the device-specific identifier as a binary sequence by overwriting the bits of the corresponding components of the reference identifier directly into the reference bitstream; and
a determination unit which is designed to:
generate a reference bitstream of the reference circuit,
generate a further bitstream for a further circuit that is changed by at least one bit of the predetermined reference identifier, and
determine at least one position of a bit which is changed in the generated further bitstream in comparison with the reference bitstream.

11. The apparatus as claimed in claim 10, additionally comprising a memory unit which is designed
to store a table in which the at least one position of a bit which is changed in the generated further bitstream in comparison with the reference bitstream is assigned to each changed bit of the reference circuit.

12. A first device comprising a programmable circuit element, wherein a device-specific identifier according to the method of claim 1 is introduced into the programmable circuit element.

13. A device comprising:
a programmable circuit element;
a memory unit which contains a device-specific identifier, a reference bitstream of a reference circuit of the circuit element along with a table, wherein the table is formed using the method of claim 1, wherein the at least one position of a bit which is changed in the further bitstream in comparison with the reference bitstream is assigned to each changed bit of the reference circuit; and
an encoding unit which generates a device-specific bitstream from the reference bitstream and the device-specific identifier making use of the table.

14. The device of claim 13, further comprising:
a random number generator that generates a device-specific identifier.

15. The device as claimed in claim 14, wherein the memory unit is designed to delete the table after the generation of the device-specific bitstream.

16. A computer program product, comprising a non-transitory computer readable hardware storage device having computer readable program code stored therein, said program code executable by a processor of a computer system to implement a method that can be loaded directly into a memory of a digital computer, comprising program code segments that are suitable for carrying out the steps of the method as claimed in claim 1.

* * * * *